United States Patent
Bahadoran et al.

(10) Patent No.: US 9,856,742 B2
(45) Date of Patent: Jan. 2, 2018

(54) SEALING SYSTEM FOR VARIABLE AREA FAN NOZZLE

(71) Applicant: Rohr, Inc., Chula Vista, CA (US)

(72) Inventors: Iman Bahadoran, La Jolla, CA (US); Jared Cox, Santee, CA (US)

(73) Assignee: ROHR, INC., Chula Vista, CA (US)

( * ) Notice: Subject to any disclaimer, the term of this patent is extended or adjusted under 35 U.S.C. 154(b) by 579 days.

(21) Appl. No.: 14/657,983

(22) Filed: Mar. 13, 2015

(65) Prior Publication Data

US 2016/0265476 A1 Sep. 15, 2016

(51) Int. Cl.
| | |
|---|---|
| F01D 11/00 | (2006.01) |
| F01D 17/14 | (2006.01) |
| F01D 9/02 | (2006.01) |
| F01D 25/26 | (2006.01) |
| F01D 25/24 | (2006.01) |
| F02K 1/80 | (2006.01) |
| F02K 1/09 | (2006.01) |

(52) U.S. Cl.
CPC .............. *F01D 11/005* (2013.01); *F01D 9/02* (2013.01); *F01D 17/143* (2013.01); *F01D 25/24* (2013.01); *F01D 25/243* (2013.01); *F01D 25/265* (2013.01); *F02K 1/09* (2013.01); *F02K 1/805* (2013.01); *F05D 2240/55* (2013.01); *F05D 2260/96* (2013.01); *Y02T 50/672* (2013.01)

(58) Field of Classification Search
CPC .......... F01D 9/02; F01D 17/143; F01D 25/24; F01D 25/243; F01D 25/265; F02K 1/09; F02K 1/805
See application file for complete search history.

(56) References Cited

U.S. PATENT DOCUMENTS

| | | | | |
|---|---|---|---|---|
| 5,778,659 | A * | 7/1998 | Duesler | F02K 1/09 239/265.27 |
| 5,833,140 | A * | 11/1998 | Loffredo | F02K 1/11 239/265.37 |
| 8,959,889 | B2 * | 2/2015 | Howe | A63F 13/12 239/265.19 |
| 2011/0030338 | A1* | 2/2011 | Vauchel | F02K 1/1261 60/226.2 |
| 2011/0174899 | A1* | 7/2011 | Vauchel | B64D 29/06 239/265.11 |
| 2014/0000237 | A1* | 1/2014 | Lucas | F02K 1/72 60/226.2 |

* cited by examiner

*Primary Examiner* — Ninh H Nguyen
*Assistant Examiner* — Brian P Wolcott
(74) *Attorney, Agent, or Firm* — Snell & Wilmer, L.L.P.

(57) ABSTRACT

In various embodiments, a nacelle may comprise a cowl, an inner panel, a VAFN panel and an overhang. The cowl may define a first portion of an outer surface of the nacelle. The inner panel may be disposed radially inward of the cowl. The VAFN panel may be disposed radially inward of the cowl. The overhang may be attached to the inner panel. The overhang may be positioned radially inward of the leading edge of the VAFN panel.

15 Claims, 5 Drawing Sheets

SEALING SYSTEM FOR VARIABLE AREA FAN NOZZLE

FIELD

The present disclosure relates to a variable area fan nozzle ("VAFN"), and more specifically, to systems for improving the sealing and aerodynamic properties of VAFNs.

BACKGROUND

A translating sleeve VAFN may be configured to adjust the nozzle cross-section of the bypass duct of a turbofan propulsion system by translating forward and aft (e.g., to stow and deploy), in a known manner. The VAFN may be used to adjust characteristics of the air flow through the fan and through the bypass duct by controlling the exhaust nozzle area. Typical VAFNs may also create aerodynamic in-efficiencies in the bypass duct or fan duct of the nacelle due to steps and gaps between the various parts of the VAFN hardware and the other nacelle hardware. The VAFN has benefits for the propulsion system, but is balanced against increased cost, weight, and aerodynamic drag.

SUMMARY

In various embodiments, a nacelle may comprise a cowl, an inner panel, a VAFN panel and an overhang. The cowl may define a first portion of an outer surface of the nacelle. The inner panel may be disposed radially inward of the cowl. The VAFN panel may be disposed radially inward of the cowl. The overhang may be attached to the inner panel. The overhang may be positioned radially inward of the leading edge of the VAFN panel In various embodiments, a pressure shell assembly may comprise an inner panel, a VAFN panel, a forward seal, and an overhang. The VAFN panel may be disposed aft of the inner panel. The forward seal may be operatively coupled to the VAFN panel. The overhang may be disposed between the inner panel and the VAFN panel. The overhang may be configured to at least partially enclose the forward seal in response to the VAFN panel being in a stowed position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a VAFN may be configured to adjust the nozzle cross-section of the bypass duct by translating forward and aft (e.g., to stow and deploy), in a known manner. The VAFN may be used to adjust the characteristics of the air flow through the fan and through the bypass duct by controlling the exhaust nozzle area.

Figure 1A:
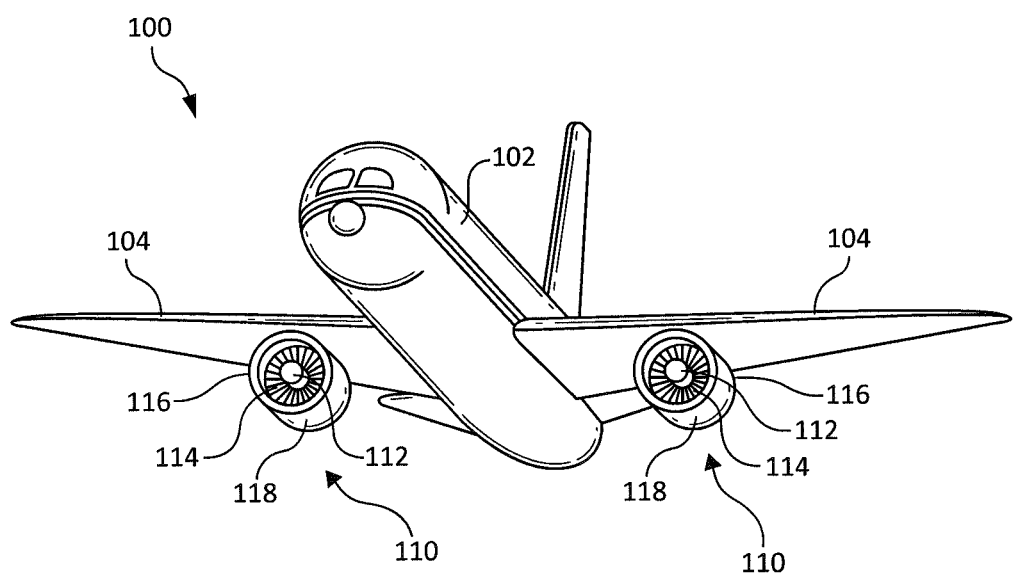
FIG. 1A illustrates a perspective view of an aircraft, in accordance with various embodiments.
Figure 1B:
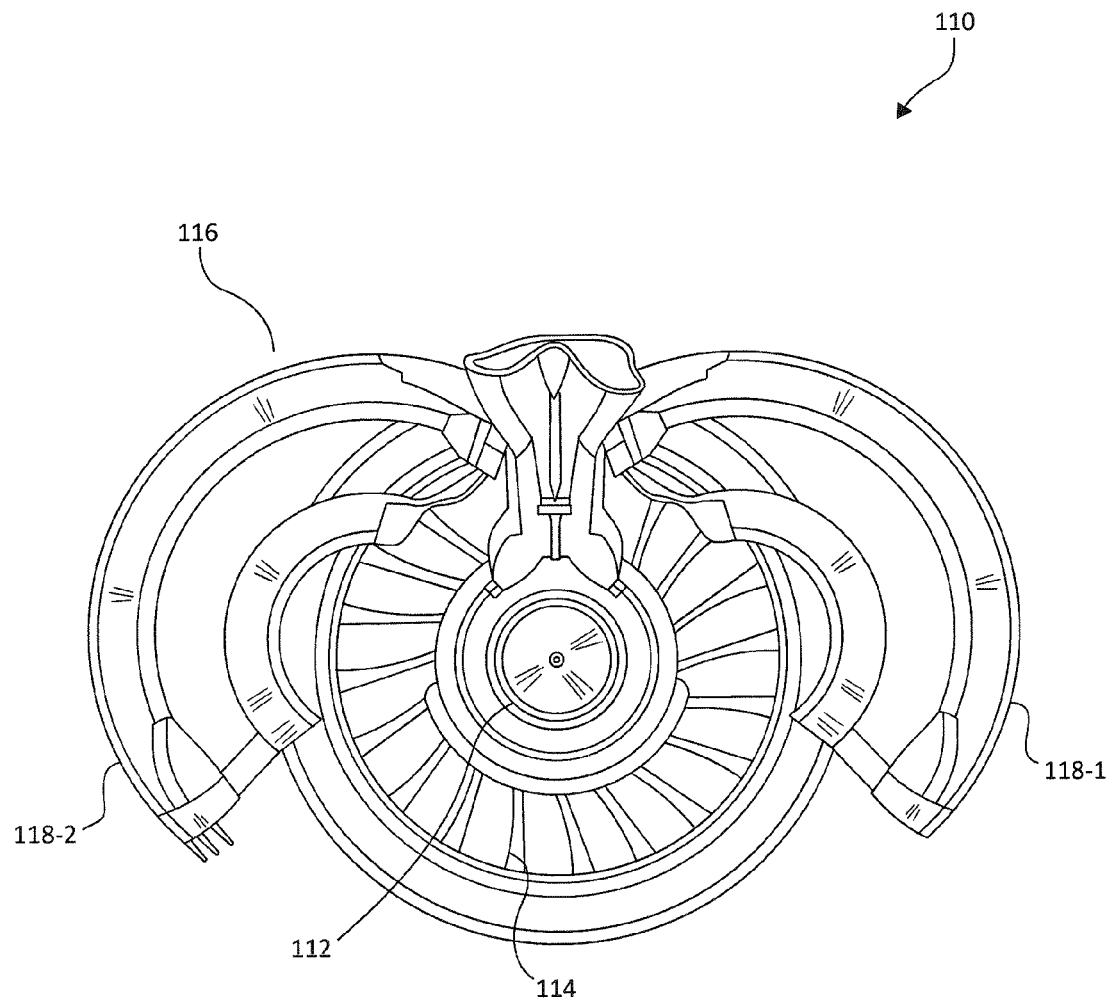
FIG. 1B illustrates a perspective view of an aircraft nacelle, in accordance with various embodiments.

In various embodiments and with reference to FIG. 1, an aircraft 100 may comprise a fuselage 102 and a pair of wings 104. Propulsion system 110 (e.g., a turbofan jet engine with a nacelle assembly) may be mounted on the underside of wing 104 or at any other suitable point on the aircraft (e.g., an aft fuselage mounted engine and/or any other suitable engine mount configuration). Propulsion system 110 may be configured to provide forward thrust and/or propulsion for aircraft 100. Propulsion system 110 may comprise an engine including an engine core 112 and a fan 114, a pylon, and a nacelle 116 (e.g., a nacelle assembly and/or a nacelle package).

In various embodiments, fan 114 may draw and direct a flow of air into and through propulsion system 110. Aft of the fan 114, the air is divided into two principal flow paths, one flow path through engine core 112, and another flow path through a bypass air duct. The engine core flow path is directed into engine core 112 and initially passes through a compressor that increases the air flow pressure, and then through a combustor where the air is mixed with fuel and ignited. The combustion of the fuel and air mixture causes a series of turbine blades at the rear of engine core 112 to rotate, and to drive the engine's rotor and fan.

The bypass air may exit the bypass air duct at the aft end of the nacelle for thrust. In turbofan engines, the bypass flow typically provides a large percentage of the thrust for an aircraft. Moreover, the exhaust area of the bypass duct is generally sized for cruise conditions to provide the maximum operating efficiency. The longest portion of the duty cycle of propulsion system 110 is likely cruise in most operating scenarios. However, a VAFN system may increase the overall efficiency of the aircraft by creating an adjustable bypass duct exhaust nozzle area to increase the operating efficiency or operating margin or stability of propulsion system 110 in non-cruise operating scenarios (e.g., take-off, climb, and descent). Nacelle 116 may include two hemispherical cowls, such as for example, cowl 118-1 and cowl 118-2 which could be thrust reversers or simply a duct that guides bypass air from the fan and includes a nozzle at the aft end. Cowl 118-1 and cowl 118-2 may provide an inside duct surface that surrounds the engine core, and an outside duct surface that has on its internal surface an aerodynamic (wetted) surface for the duct air and on its outside an aerodynamic surface for the atmospheric air. Cowl 118-1 and cowl 118-2 may be configured to open clam-shell style with hinges along its top edge and latches along its bottom edge. Alternatively, instead of Cowl 118-1 and cowl 118-2, nacelle 116 may include one continuous cowl 118 around the engine core and the bypass duct.

If cowl(s) 118 constitutes a translating sleeve-style thrust reverser, then the outside aerodynamic surface of cowl 118 may be formed on the thrust reverser translating sleeve. The translating sleeve may comprise in inner and outer panel joined at their aft ends, in a known manner. The translating sleeve forms part of a thrust reverser system and moves between a stowed and deployed position in a known manner. Each cowl 118 of nacelle 116 may also comprise a VAFN. The VAFN may be mounted on or otherwise formed as part of the inner panel of the translating sleeve.

Figure 2:
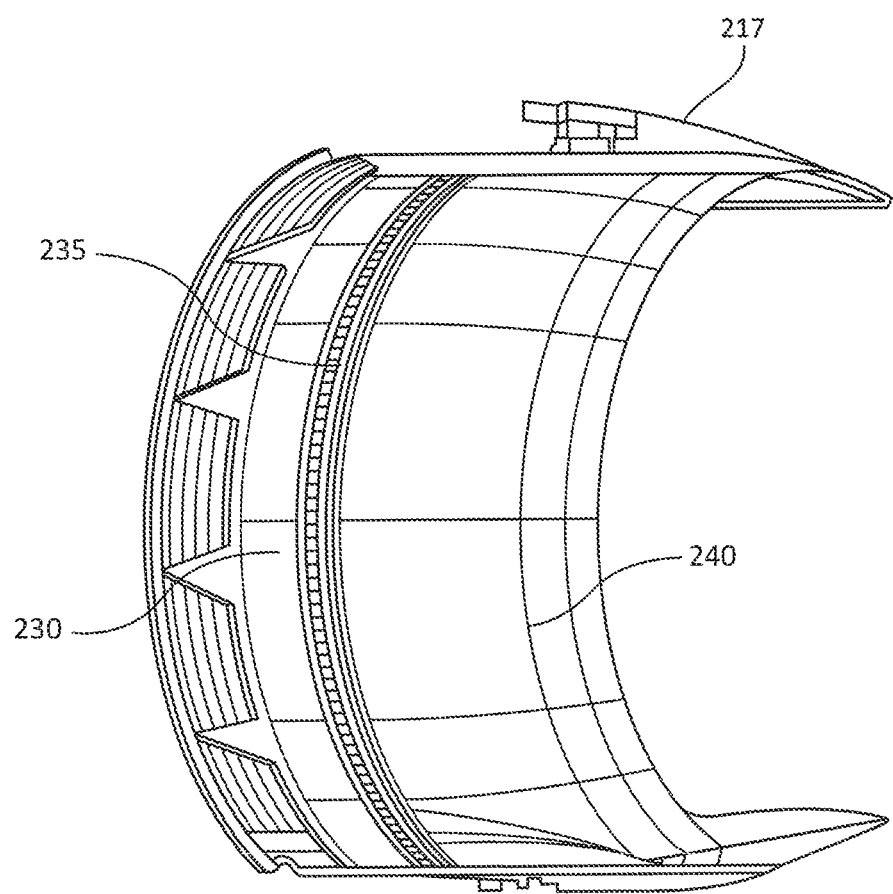
FIG. 2 illustrates a perspective view of an internal portion of a nacelle hemisphere, in accordance with various embodiments.

With reference to FIG. 2, a translating sleeve 217 may comprise an inner panel 230 and a VAFN 240. Inner panel 230 may define the internal flow channel and/or barrel of the translating sleeve 217. VAFN 240 may be operatively coupled to and disposed radially inward and on the aft end of translating sleeve 217. VAFN 240 may be configured to translate forward and aft independent of translating sleeve 217. In various embodiments, an overhang 235 may be disposed between inner panel 230 and VAFN 240. Overhang 235 may be disposed along the interior profile of translating sleeve 217 and may be appropriately shaped to conform to a forward portion and/or leading edge of VAFN 240. In this regard, overhang 235 may be configured as a transition to limit turbulence within the bypass duct when VAFN 240 is in a deployed position and/or in operation (e.g., when VAFN 240 is translated aft).

Figure 3:
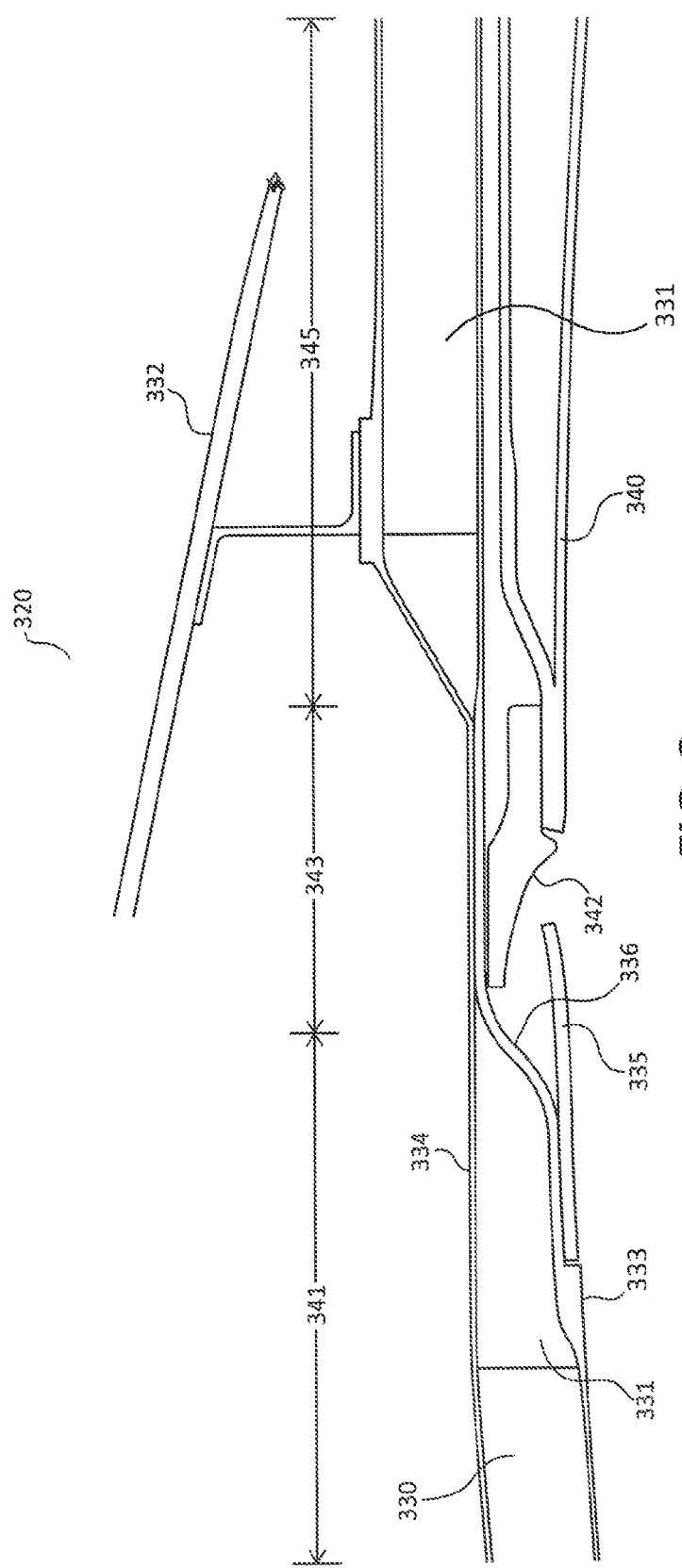
FIG. 3 illustrates a cross-sectional view of a portion of a nacelle hemisphere including an exemplary inner panel, an exemplary overhang and an exemplary VAFN, in accordance with various embodiments.
Figure 4:
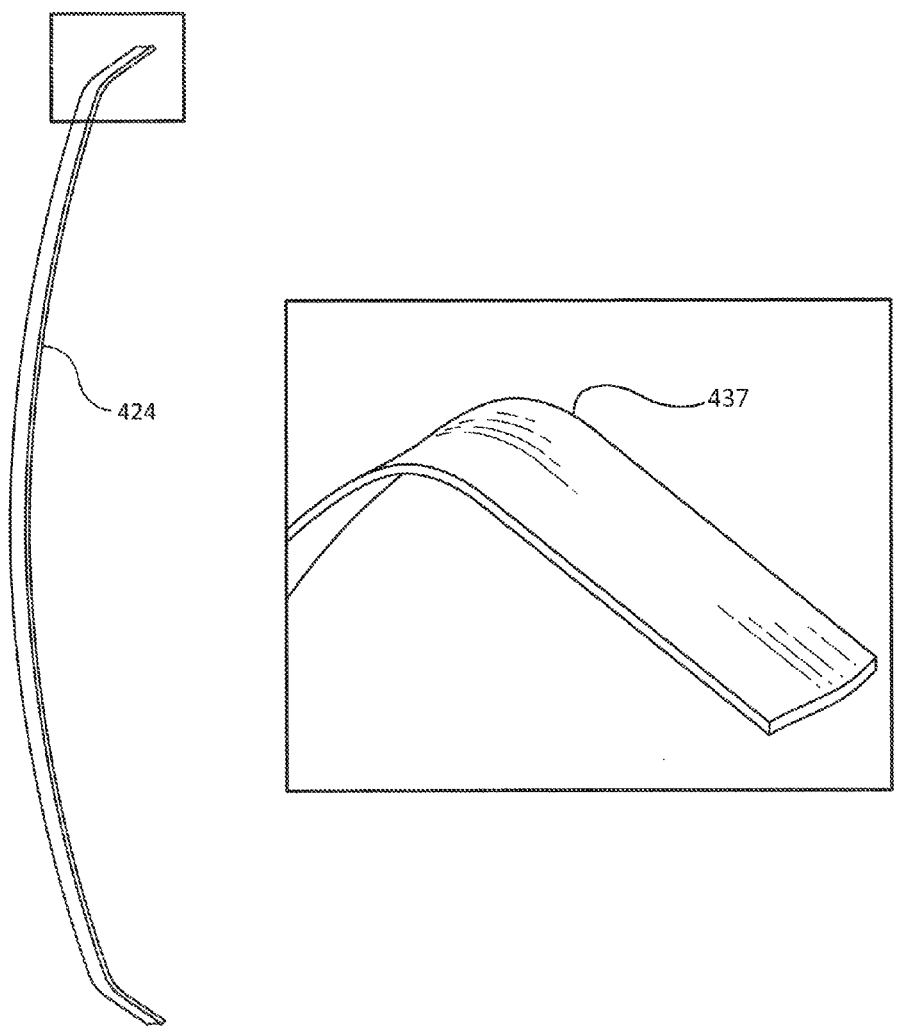
FIG. 4 illustrates a perspective view of an overhang installable on an internal portion of a nacelle hemisphere, in accordance with various embodiments.

In various embodiments and with reference to FIGS. 3 and 4, translating sleeve 320 may comprise an inner panel 330 (e.g., the panel that defines the radial outer wall of the bypass duct) and outer panel 332 (e.g., the outer surface of the nacelle). Inner panel 330 may have a first skin 333 and a second skin 334. Disposed between first skin 333 and second skin 334 may be core 331. In this regard, inner panel 330 may have a composite structure. The VAFN 240 may likewise comprise a panel having an inner and outer skin and a core between them. The VAFN 240 panel may be positioned generally in parallel with the inner panel 330 and radially inward thereof.

In various embodiments, the cross-sectional profile of inner panel 330 may vary over the length of inner panel 330. In this regard, first skin 333 and second skin 334 may be disposed in a separated configuration over a first portion 341. First skin 333 and second skin 334 may transition to a second portion 343 where first skin 333 and second skin 334 are adjacent to and in contact with one another. Moreover, second portion 343 may define a pocket 336 for VAFN 340. First skin 333 and second skin 334 may transition again to a separated configuration over a third portion 345. In this regard and as discussed herein, first skin 333 and second skin 334 may surround a core 331 over third portion 345. Moreover, first skin 333 may continue to define pocket 336 over third portion 345. In this regard, first skin 333 may transition radially outward at the transition between first portion 341 and second portion 343. First skin 333 may continue along a path associated with the radially outward configuration that defines pocket 336.

In various embodiments, overhang 335 may be installed at the transition between first portion 341 and the second portion 343. Overhang 335 may extend tangentially from first skin 333 as first skin 333 transitions radially outward at second portion 343. In this regard, overhang 335 covers a portion of pocket 336. Overhang 335 defines a smooth transition for pocket 336 and minimizes turbulence created by VAFN 340, when VAIN 340 is in a stowed configuration. In its stowed position, a forward portion of VAFN 340 may be covered by and may be radially outward of overhang 335.

In various embodiments and with reference to FIG. 3, overhang 335 may be attached to and/or disposed along an interior surface of inner panel 330 to create a transition between inner panel 330 and VAFN 340. VAFN 340 may comprise a VAFN forward seal 342. VAFN forward seal 342 may be operatively coupled to and/or disposed on a forward edge and/or surface of VAFN 340. VAFN forward seal 342 may also be integrally formed on or as part of VAFN 340. VAFN seal is compressed against the first skin 333 to form a seal between the first panel 330 and the VAFN 340. VAFN seal extends forward of the forward edge of VAFN 340. VAFN forward seal 342 may be configured to interface with overhang 335 to create the transition between inner panel 330 and VAFN 340. In the stowed position, VAFN forward seal 342 may be disposed forward of at least a portion of overhang 335. This configuration creates a smooth transition between VAFN forward seal 342 and overhand 335. The smooth transition minimizes turbulence created by VAFN 340 in its stowed configuration.

In various embodiments, the interface between VAFN forward seal 342 and overhang 335 may create a pressure shell in nacelle hemisphere 320 and along the inner barrel of the nacelle. In this regard, pressurized flow from the fan may be conducted along the surface defined by inner panel 330 of translating sleeve 320 within the pressure shell created by the interface between overhang 335 and VAFN forward seal 342 when VAFN 340 is deployed.

In various embodiments, VAFN 340 may be translated aft in the deployed configuration. The translating movement of VAFN 340 requires a gap between VAFN 340 and inner panel 330. VAFN forward seal 342 may be configured to close that gap. Moreover, the interface between VAFN forward seal 342 and overhang 335 may create a substantially closed pressure shell that is configured to reduce leakage of fan flow from the bypass duct. Moreover, the interface between overhang 335 and VAFN forward seal 342 may be configured to improve the aerodynamic performance of the nacelle and/or reduce turbulence in the fan flow through the nacelle. The interface between VAFN forward seal 342 and overhang 335 may also reduce noise that could otherwise be attributable to turbulence introduced by the void that would otherwise exist between VAFN 340 and inner panel 330.

In various embodiments and with reference to FIG. 4, overhang 424 may be made of any suitable material. For example, overhang 424 may be a composite material, a metal material and/or the like. Moreover, overhang 424 may be operatively coupled to and/or attached to an interior surface of the nacelle hemisphere and, more specifically, to the inner panel. Overhang 424 may be operatively coupled to and/or fixedly attached to the inner panel with one or more fasteners, in a manner that the radially inward surface of overhang 424 is flush with the radially inward surface of the inner panel. Moreover, overhang 424 may also have any suitable shape and/or profile. In the regard, overhang 424 may have a uniform shape or a non-uniform shape (e.g., bent ends 437, dog eared ends, and/or the like).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A nacelle, comprising:
a cowl defining a first portion of an outer surface of the nacelle;
an inner panel disposed radially inward of the cowl;
a variable area fan nozzle (VAFN) panel disposed radially inward of the inner panel;
an overhang attached to the inner panel and which is positioned radially inward of the leading edge of the VAFN panel, wherein the VAFN panel comprises a forward seal compressed against the inner panel and forming a seal therebetween.

2. The nacelle of claim 1, wherein the forward seal is disposed on a forward portion of the VAFN panel and is radially outward of the overhang and wherein a portion of the forward seal is covered by the overhang when the VAFN panel is in the stowed position.

3. The nacelle of claim 1, wherein the forward seal and the overhang define a transition between the inner panel and the VAFN panel.

4. The nacelle of claim 3, wherein the transition is configured as a smooth surface that is configured to minimize turbulence of fan flow with the nacelle.

5. The nacelle of claim 1, wherein the overhang and the forward seal define a portion of a pressure shell of the nacelle.

6. The nacelle of claim 1, wherein the overhang is operatively coupled to a portion of the inner panel and has a profile that conforms to the inner panel.

7. A pressure shell assembly, comprising:
an inner panel;
an variable area fan nozzle (VAFN) panel disposed aft of the inner panel;
a forward seal operatively coupled to the VAFN panel and compressed against the inner panel to form a seal therebetween;
an overhang disposed between the inner panel and the VAFN panel and configured to at least partially enclose the forward seal in response to the VAFN panel being in a stowed position.

8. The pressure shell assembly of claim 7, wherein the inner panel and VAFN panel define an internal flow surface of a nacelle.

9. The pressure shell assembly of claim 7, wherein the forward seal is integrally formed on the VAFN panel.

10. The pressure shell assembly of claim 7, wherein the forward seal and the overhang define a transition between the inner panel and the VAFN panel.

11. The pressure shell assembly of claim 10, wherein the transition is configured as a smooth surface that is configured to minimize turbulence of fan flow with the nacelle.

12. The pressure shell assembly of claim 7, wherein the overhang has a profile that conforms to the inner panel.

13. The pressure shell assembly of claim 7, wherein the pressure shell assembly is configured to be installed in a nacelle to minimize turbulence and noise.

14. The nacelle of claim 1, wherein the inner panel has a first skin defining a radially inner surface of the inner panel and a second skin defining a radially outer surface of the inner panel, the seal compressed against the first skin.

15. The nacelle of claim 2, wherein the portion of the forward seal is disposed radially outward from the overhang.

* * * * *